June 23, 1959  F. J. WINCHELL  2,891,828
TRANSMISSION
Filed June 6, 1957  2 Sheets-Sheet 2
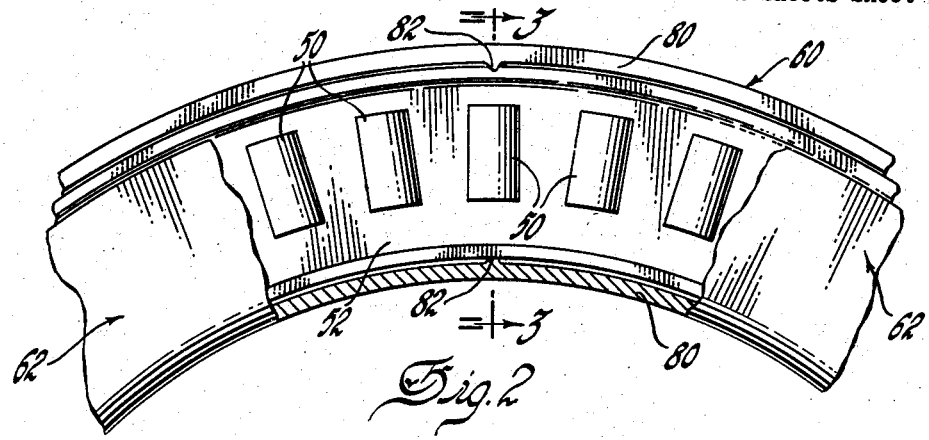
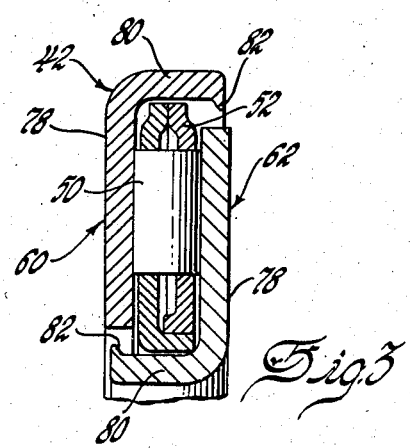
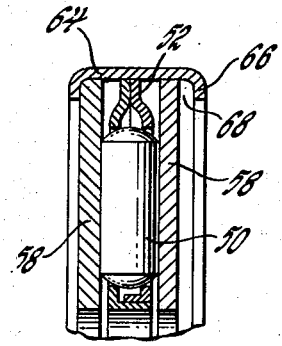
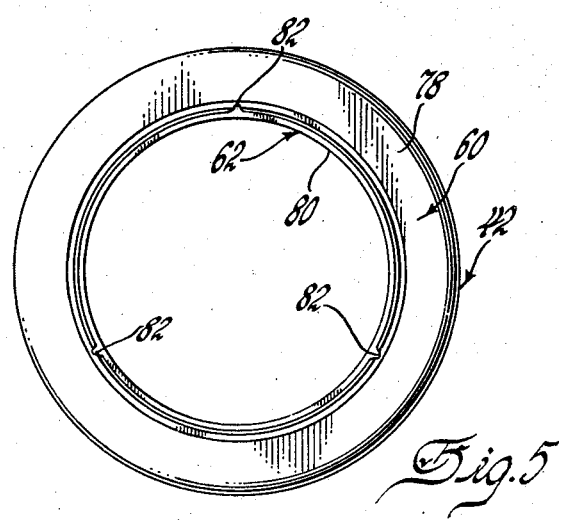
INVENTOR.
BY Frank J. Winchell
T. L. Chisholm
ATTORNEY United States Patent Office 2,891,828
Patented June 23, 1959

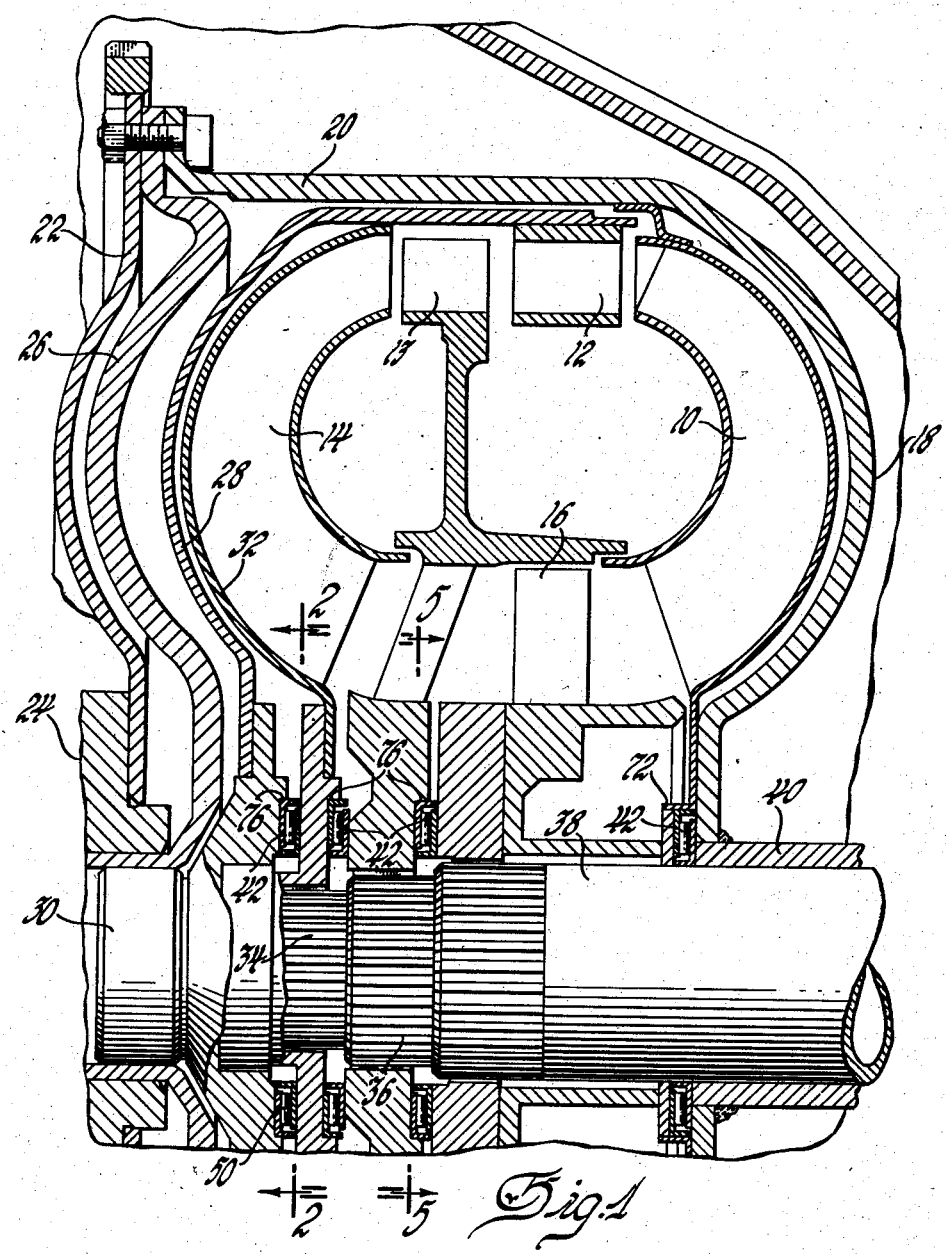

2,891,828

TRANSMISSION

Frank J. Winchell, Bloomfield Hills, Mich., assignor to General Motors Corporation, Detroit, Mich., a corporation of Delaware Application June 6, 1957, Serial No. 664,092

3 Claims. (Cl. 308—235)

This invention relates to transmissions, particularly to hydrodynamic torque transmitting means (for example torque converters) equipped with a novel thrust bearing and to the construction of the bearing itself.

In the accompanying drawings Fig. 1 is one-half of a symmetrical axial or longitudinal section of a hydrodynamic torque transmitting device embodying one form of the invention;

Fig. 2 is a fragment of an enlarged section on the line 2—2 of Fig. 1 showing partly in elevation and partly broken away one form of thrust bearing embodying the invention;

Fig. 3 is an enlarged section on the line 3—3 of Fig. 2;

Fig. 4 is a section like Fig. 3 of another form of a bearing, and

Fig. 5 is an elevation of the bearing of Figs. 1, 2 and 3 as seen from the line 5—5 of Fig. 1.

The torque transmitting device as shown in Fig. 1 may be a hydrodynamic torque converter having a bladed impeller 10, a plurality of bladed turbines 12, 13 and 14, and a bladed guide wheel, reaction member or stator 16. The impeller includes a toroidal shell 18 connected by a flange 20 forming part of the shell to a flywheel 22 driven by the crankshaft 24 of an engine. The turbines are enclosed wthin a container formed by shell 18 and a cover 26, and the turbine 12 may have an inner shell 28 connected to a drive shaft 30, while the turbine 14 may have a shell 32 connected to a drive shaft 34. The turbine 13 may be connected to a drive shaft 36 and the guide wheel may be connected to a ground sleeve 38 fixed to the frame of the transmission. The drive shafts may be connected through any suitable gearing, not shown, to a common output shaft, as is known. The shells each have an opening in the center which opening in the shell 18 may be surrounded by a tube 40 welded to the shell 18 and surrounding the aforementioned drive shafts and ground sleeve and may be sealed to the ground sleeve by any suitable seal, not shown.

The impeller 10 including the shell 18, the turbine shells 28 and 32, and guide wheel 16 form a container in the shape of a torus which contains liquid which transmits torque from the impeller to the turbines and hence to the drive shafts when the impeller is rotated by the engine.

The structure so far described is known, and its particular form is immaterial to my invention. Such known devices operate satisfactorily within their inherent limitations, but have certain disadvantages. For example, the rotation of the body of liquid in the toroidal chamber is frequently at high speed such as 4000 r.p.m. At such speeds centrifugal force produces a very great hydrostatic pressure in the chamber. It has been found that this pressure is sufficient to expand in the axial direction the various shells, such as 18, 28 and 32. This expansion (called ballooning) may move parts as much as a tenth of an inch, and the force involved in the expansion produces thrust of high value between adjacent parts. As is known, the guide wheel 16 is sometimes stationary and sometimes rotates, while the turbines 12, 13 and 14 may be stationary while the impeller is rotating, or they may rotate at different speeds with respect to each other and to the impeller. It is unavoidable that heavy thrust between relatively rotating members is developed. Originally attempts were made to take care of this thrust by plain thrust bearings of the usual bearing materials, but such bearings were not sufficiently durable, even when constantly lubricated, as occurs when the working liquid in the torque converter is oil. Because of limitations of space, such thrust bearings must be thin, and preferably interchangeable with existing plain bearings.

One of the objects of my invention is to provide an improved thrust bearing which is very thin, very durable, capable of sustaining heavy thrust loads and which does not wear the apparatus in which it is used, and to provide a hydrodynamic torque transfer device including such bearings in order to eliminate some of the disadvantages resulting from heavy thrust and expansion of the shells in the torque transmitting devices heretofore known.

Another object is to provide an improved torque transmitting device having provision for positively holding the thrust bearings in place, in spite of the expansion or ballooning of the shells.

In carrying out my invention I provide an improved thrust bearing 42 wherever necessary between each pair of relatively rotating parts. This bearing is constructed as described below and as completely assembled is preferably of the same thickness as the plain thrust washers heretofore used. However, in order to realize all the advantages of the invention the rotating parts of the torque converter and its associated gearing may be modified or specially adapted to receive and retain the improved bearing.

Each bearing 42 includes a large number of slender, hardened thrust rollers 50 in the form of cylinders of uniform diameter, see Figs. 2, 3 and 4. The cylinders are held by any suitable cage 52, for example one formed by a pair of perforated sheet metal washers crimped together so that the cylinders project through the perforations on opposite sides of the spacer. A hardened thrust plate is placed on either side of the assembled set of rollers. Examples of such plates are the washers 58 of Fig. 4 and the members 60, 62 of Fig. 3. This assembly can readily be made to the same thickness as a bronze thrust washer as commonly used.

Previous attempts to use roller thrust bearings before my invention have not met with success. If the bearings are very thin, the diameter of the rollers is of the order of $\frac{1}{16}$ of an inch and the hardened thrust washers being of less thickness. When such rollers with their spacers and separate thrust washers have been assembled in a torque converter of the type shown in Fig. 1, expansion of the shells during operation has caused the shells to move far enough to let the washers or bearings or both drop out of position. It is desirable to hold the rollers, cage and thrust plates assembled as a unit, first for ease in handling and in assembling the transmission, and second to hold all parts of the bearing properly assembled and in place in the transmission during operation.

I attempted to overcome the difficulties previously encountered by providing on each shell of the torque converter an axially extending support for the bearing and holding the bearing assembled by a cap 64 as shown in Fig. 4, having radial flanges 66, at least one of which is formed after the bearing is assembled to hold all of the parts in assembled relationship. Preferably, the axial distance between the two flanges 66 is greater than the combined axial thickness of the rollers and washers so that a space 68 is left inside the assembled bearing to permit free relative rotation of all of the parts.

The axially extending support for the bearing may be the cylindrical flange 72 on the impeller or it may be the shoulder 76 on each of the hub members of the turbines 12, 13 and 14. A bearing assembled from a series of rollers and thrust washers or a pair of thrust washers of the least practical thickness together with a cap such as 64 is thicker than the amount of axial expansion which we have encountered in shells of torque transmitting devices of this character. Consequently any expansion of the shell encountered in practice will still permit retention of the thrust bearing in the support.

While the arrangement just described removed some of the disadvantages it unexpectedly brought new ones. It was found that the thrust washers frequently wore the caps 64, quickly cutting them in two. Also the washers wore grooves in various drive shafts. This is believed to be due to slight eccentricities between adjacent relatively rotating parts separated by the bearings. In structures of this character the complex nature of the parts and of the forces occurring during its use make it very difficult as a practical matter to have all adjacent rotating parts precisely concentric. This causes the thrust washers 58 to move eccentrically with the rotating parts against which they bear and the radial components of such eccentric movement brings the washers into repeated contact with the caps 64 or with the shafts such as 38. This contact is sometimes under very heavy radial load so that the caps 64 are sometimes eventually cut in two and the shafts, such as 38, are grooved deeply enough to reduce their strength significantly.

Another disadvantage is that the overhanging flanges of the caps 64 constitute obstructions to the bearing washers 58 unless recesses or undercuts are formed in the rotating parts. This makes it impossible to substitute an improved roller thrust bearing for the plain thrust washers in many existing structures.

I overcome the disadvantages above referred to by constructing the thrust bearing as shown in Fig. 3. Each bearing member 60 and 62 is of L-shaped cross section, having a radial bearing part 78 and an integral cylindrical supporting flange 80. The edges of the flanges are rounded, and the free edge of each flange is formed with at least three projections 82, which with the flange 80 constitute hooks which overlie the cage 52 and prevent the cage from coming out of the members 60 and 62.

I prefer to form each member 60 and 62 with the projections before hardening and then harden the entire structure. After hardening the points of the projections 82 are ground to determine a circle whose diameter is substantially identical with the corresponding diameter of the cage. That is, the hooks or projections 82 on the member 60 determine a circle whose diameter is substantially identical with the outside diameter of the cage and the projections 82 on the member 62 determine a circle whose diameter is substantially identical with the inside diameter of the cage. By substantially identical I mean that either the diameters are mathematically identical or that the diameter of the circle of the projections of the member 60 is slightly less than the outside diameter of the cage, and the diameter of the circle of the projections of the member 62 is slightly greater than the inside diameter of the cage, so that the projections have a friction fit or interference fit with the cage. I use the term interference fit to mean that the diameters of the cage and of the circle determined by the points of the race are so related that the cage and the race cannot freely pass each other, and can only pass where force is used, which force either overcomes friction (as where the diameters are precisely equal) or one or the other of the members is shrunk or stretched (as where the diameters are different). Thus, I use the term interference fit generically to cover both instances, and use the term friction fit to denote a species of interference fit which occurs when the diameters are equal. This permits the members 60 and 62 to be snapped over the cage by an axial force which can be exerted readily by hand or by a light press in the assembly operation. After being assembled in this manner the members 60 and 62 cannot come off from the cage during service of the bearing because the friction fit or interference fit will prevent it, there being no axial force in service tending to separate the members 60 and 62.

I have found that where such a bearing is used in a torque converter, as shown in Fig. 1, in which the relatively rotating parts move axially the broad smooth surface of the flange 80 having rounded corners, as shown, has sufficient area of bearing surface on the parts with which they come in contact radially to sustain any radial loads without undue wear or cutting of the parts they contact.

I claim:

1. A thrust bearing comprising in combination a cage supporting a circular group of radially arranged bearing rollers, the cage extending radially inside and radially outside the rollers; a race having an L-shaped cross section including a hardened radial bearing part and a circumferential axially extending hardened supporting part snapped over the outside diameter of the cage; and a second race having an L-shaped cross section including a hardened radial bearing part and a circumferential axially extending hardened supporting part snapped over the inside diameter of the cage.

2. A thrust bearing comprising in combination a cage supporting a circular group of radially arranged bearing rollers, the cage extending radially inside and radially outside the rollers which extend axially beyond both sides of the cage; a hardened race having an L-shaped cross section including a hardened radial bearing part and an integral circumferential axially extending hardened cylindrical supporting flange of larger internal diameter than the external diameter of the cage, the flange extending axially on opposite sides of the cage; and at least three isolated, widely-spaced, hardened projections formed integral with the flange and extending radially inwardly from the free edge of the flange, the circle determnied by the ends of the projections having its diameter so related to the external diameter of the cage to provide an interference fit between the cage and the flange.

3. A thrust bearing comprising in combination a cage supporting a circular group of radially arranged bearing rollers, the cage extending radially inside and radially outside the rollers which extend axially beyond both sides of the cage; a hardened race having an L-shaped cross section including a hardened radial bearing part and an integral circumferential axially extending cylindrical hardened supporting flange of larger internal diameter than the external diameter of the cage, the flange extending axially on opposite sides of the cage; at least three isolated, widely-spaced, hardened projections formed integral with the flange and extending radially inwardly from the free edge of the flange, the circle determined by the ends of the projections having its diameter so related to the external diameter of the cage to provide an interference fit between the cage and the flange, a second hardened race having an L-shaped cross section including a hardened radial bearing part and an integral circumferential axially extending cylindrical hardened supporting flange of smaller external diameter than the internal diameter of the cage, the second flange extending axially on opposite sides of the cage; and at least three isolated, widely-spaced, hardened projections formed integral with the second flange and extending radially outward from the second flange, the circle determined by the last-named projections having its diameter so related to the internal diameter of the cage to provide an interference fit between the cage and the second flange.

References Cited in the file of this patent

UNITED STATES PATENTS

| | | |
|---|---|---|
| 882,061 | Greiner | Mar. 17, 1908 |
| 1,667,565 | Radcliffe | Apr. 24, 1928 |
| 2,055,524 | Ellis | Sept. 29, 1936 |
| 2,658,346 | Seybold | Nov. 10, 1953 |